Inventor:
Wallace B. Watson,
by Merton D Moore
His Attorney.

2,797,411
Patented June 25, 1957

2,797,411

ELECTRONIC CURSOR

Wallace B. Watson, Clay, N. Y., assignor to General Electric Company, a corporation of New York Application March 14, 1952, Serial No. 276,533

18 Claims. (Cl. 343—11)

My invention relates to display systems for object-locating equipment, such as pulse-echo apparatus. More particularly, my invention pertains to a plan-position-indicator type of display system and has for a principal object the provision of certain improvements in such a system to facilitate the determination of object or target bearing.

Still more particularly, the invention relates to that class of pulse-echo apparatus in which the positions of remote objects located in various directions from the apparatus are indicated on the viewing screen of a cathode ray tube, and in which a visible line is produced on the viewing screen in a desired direction that may be varied to indicate the direction or bearing of a particular object. Such a line is commonly referred to as a "cursor" and one of the objects of my invention is to provide improved means for producing such a cursor.

Another object of my invention is to provide a plan-position-indicator type display system featuring essentially all-electronic means for deriving a bearing-determining cursor of controllable orientation.

Yet another object of my invention is to provide a bearing-determining cursor for a plan-position-indicator by employing time-sharing of cursor sweeps and of target-indicating sweeps in a manner minimizing loss of target resolution resulting from such time-sharing.

A further object of my invention is to provide a cursor which may be controlled in its orientation for alignment with a given target indication to determine the bearing of the corresponding target and which may also be employed for a range measurement.

Briefly stated, a display system in accordance with my invention is adapted for inclusion in pulse-echo apparatus and comprises a cathode-ray indicator, to the beam deflection system of which a pair of two-coordinate sweep waves are applied in selective alternation. The components of one of these waves represent orientation of the radar antenna, and thus a plan-position indicator type display is produced. The components of the other wave are dependent upon the position of a manually adjustable bearing-indicator control to define a cursor on the viewing screen of the indicator. The selective alternation of sweeps is so controlled that the number of cursor sweeps across the viewing screen is essentially fixed and constitutes a small fraction of the number of target-indicating sweeps.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which

Figure 1:
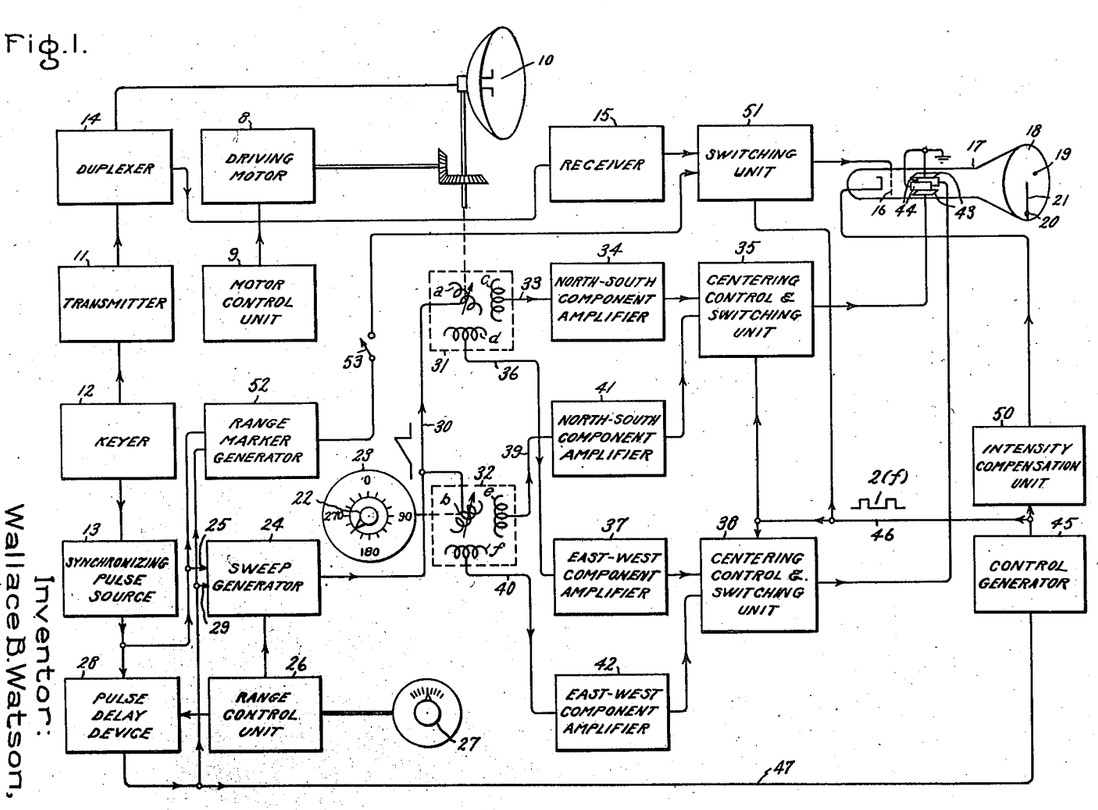
Fig. 1 represents a functional block diagram of a complete radar apparatus incorporating a display system in accordance with my invention.

Referring now to Fig. 1 of the drawings, there is shown a directional antenna 10 to which pulses of radio-frequency energy having a frequency in the ultra-high frequency range are supplied by a transmitter 11 for radiation into space. This transmitter is controlled by a keyer 12, which provides pulses having a duration of, for example, one microsecond and may recur at a frequency from 50 to 2,000 cycles per second. The radiated pulses, which may be of the same duration, travel through space and may impinge upon a reflecting surface of an object and are thus returned toward the site of the radar apparatus for interception by antenna 10.

Received echo-pulses from the antenna are applied through a duplexer unit 14 to a receiver 15 for conversion from radio-frequency to video-frequency energy. Duplexer 14 may be of any suitable form serving to prevent damage and/or blocking of the receiver 15 during pulsing of transmitter 11. Moreover, the duplexer translates intercepted signals from antenna 10 to the receiver with substantially no attenuation.

Each of the elements, thus far described, may be of conventional construction, and detailed descriptions thereof are deemed unnecessary.

Antenna 10 is supported for rotation about a vertical axis, being driven by a motor 8 which is under the control of a motor-control unit 9, and its orientation during interception of target-reflected echoes represents the direction or bearing of the corresponding targets. In addition, as is generally well known, the travel time for a pulse in leaving and returning to antenna 10 represents the range of the reflecting target.

In order to display both range and bearing of a reflecting target, the video output signals from receiver 15 are supplied to control electrode 16 included in the electron beam-deriving system of a cathode-ray type indicator tube 17 for controlling the intensity of the electron beam projected toward a viewing screen 18. Tube 17, of course, also is provided with means (not shown) to focus and accelerate the electron beam generated therein. At the same time, by means later to be described, the electron beam is deflected in response to a sawtooth sweep signal from the center of screen 18 toward its periphery in a direction corresponding to the orientation of antenna 10 about its vertical axis. More specifically, each sweep of the electron beam across screen 18 is initiated with radiation of a pulse by antenna 10 and proceeds at an adjustably fixed rate, which is selected so that the distance from the center of the screen to its outer periphery represents a given maximum range. Since returning echoes control the intensity of the electron beam, they are displayed on viewing screen 18 as intensified spots, such as 19 and 20, and a plan-position-indicator type display is presented on screen 18.

In order to facilitate the determination of target bearing, the receiver of Fig. 1 includes means, to be described in detail hereinafter, for developing a cursor 21 on viewing screen 18. The cursor is constituted of a radial trace or line on the viewing screen, and its position is under the control of a rotatable manual member 22 having a pointer, or index member, adapted to traverse a bearing scale 23. Accordingly, by manipulating member 22, the position of cursor 21 may be adjusted to intercept one of the target indications, such as spot 20 and the corresponding reading of scale 23 represents target bearing.

For developing the required sawtooth deflection voltages to provide the target and cursor displays, the receiver of Fig. 1 includes a sweep generator 24 which may comprises any well-known from of synchronizable means for deriving a highly linear sawtooth wave. Synchronizing pulses from a source 13, which are timed with the pulses generated by keyer 12, are applied to generator 24 via a lead 25. These pulses are represented by curve *a* in Fig. 2. This Fig. 2 includes several curves illustrating the signal potentials at various points in the apparatus, plotted to a common time scale. The pulses from source 13 serve to control the initiation of each pulsation in the sawtooth wave developed by generator 24, and the slope of these pulsations is governed by a range control unit 26 having a manual adjustment 27.

A pulse-delay device 28, such as a delay multivibrator, also receives pulses from source 13 and, in response to the adjustment of unit 26, provides corresponding pulses delayed in time by an interval equal to the travel time for a selected maximum range. These delayed pulses, represented by curve *b* in Fig. 2, are applied over a lead 29 to generator 24 and serve to terminate each sawtooth undulation.

Figure 2:
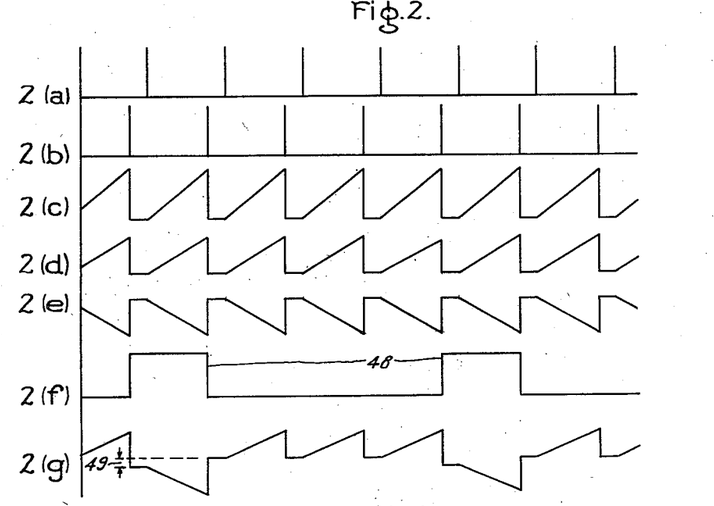
Fig. 2 represents certain characteristics useful in explaining the operation of a portion of the apparatus shown in Fig. 1.

Thus, each pulse or sawtooth of the wave developed by generator 24, which is represented by curve *c* of Fig. 2, is initiated simultaneously with radiation of each transmitted pulse and is terminated simultaneously with the next following pulse of curve *b*. These sawtooth pulses have a duration which corresponds to the longest range from which echo pulses are to be displayed.

The sawtooth wave of curve 2*c* is supplied over conductor 30 to rotatable coil *a* of an antenna bearing resolver 31 and to a rotatable coil *b* of a cursor-control position resolver 32. Coil *a* is mechanically coupled to antenna 10 for rotation therewith and coil *b* is mechanically coupled for rotation with control 22.

The antenna bearing resolver also includes fixed coils *c* and *d* oriented at 90° relative to one another. It produces, for example at coil *c*, a sawtooth wave which, for a given position of antenna 10, may be represented by curve *d* in Fig. 2. This sawtooth is synchronous with wave 2*c*, but is of one polarity when the antenna is directed in a northerly direction and of the opposite polarity when the antenna is orientated in a southerly direction. In either case, the magnitude of the wave increases from zero as the antenna direction becomes more northerly or southerly from either a due east or a due west direction. This wave 2*d* from coil *c* is supplied over a conductor 33 to an amplifier 34 and after amplification is supplied to a centering-control and switching unit 35, later to be described.

The antenna resolver 31 also produces at coil *d* a corresponding sawtooth wave on conductor 36 which varies with respect to east and west in the same manner as does wave 2*d* with respect to north and south. This wave is amplified by an amplifier 37 and supplied to centering-control and switching unit 38, which is identical with unit 35.

The cursor-control position resolver 32 is identical with resolver 31, including fixed coils *e* and *f*, but since its coil *b* is mechanically coupled with manual control 22, the north-south component of the sawtooth wave derived at coil *e* and applied to lead 39, and the east-west sawtooth component derived at coil *f* and appearing at lead 40 are dependent upon the position of manual control 22 relative to the indicia of scale 23. The sawtooth wave at lead 39, which for a given position of control 22 may be represented by curve 2*e*, is amplified in an amplifier 41 and therafter applied to switching unit 35. Similarly, the sawtooth at lead 40 is amplified in amplifier 42 and applied to switching unit 38.

Thus, the north-south components of both the antenna and cursor-control resolvers are applied to unit 35, and these voltages are applied in selective alternation to the vertical deflection plates 43 of cathode ray indicator 17. Also, the east-west components of these resolvers are applied via switching unit 38 to horizontal deflection plates 44 of the indicator in selective alternation.

A control generator 45 is coupled to switching units 35 and 38 by a lead 46 and receives the delayed synchronizing pulses of curve 2*b* over a lead 47. It serves to generate a series of control pulses having a repetition frequency smaller than that of the signal from source 13 but of a duration corresponding essentially to the period of that signal. The pulse-type or square wave from generator 45 is represented by curve 2*f* and, as shown, it includes a series of pulses 48 which control the operation of switching units 35 and 38. During the intervals between pulses 48, the sweep voltages representing antenna bearing are applied to deflection system 43—44, whereas for the duration of each pulse, the cursor-control position sweep wave is applied thereto. For example, considering the north-south components alone of curves 2*d* and 2*e*, during the intervals between pulses 48, the voltage represented by curve 2*d* is supplied to vertical deflection plates 43. However, during the occurrence of each of pulses 48, the voltage of curve 2*e* is applied and the composite resulting deflection wave is illustrated by curve 2*g*.

As will be described more fully hereinafter, units 35 and 38 include centering-control means, and a static deflection field is provided for each of the cursor-control and target-indicating sweep signals. Consequently, the composite wave may exhibit a static potential displacement between the components corresponding to the sawtooth voltages shown by curves 2*d* and 2*e*, such as represented by numeral 49 in curve 2*g*.

To make visible a trace on screen 18, representing the cursor sweeps, an intensity compensation on unit 50, controlled by generator 45, supplies an electron beam-intensifying voltage to electron gun 16 during operating intervals wherein the cursor sweeps occur. This unit 50 alone may be of any well-known construction.

It is desirable to prevent intensity variations of trace 21 due to output signals from receiver 15. To that end, a switching unit 51 is interposed between the receiver output circuit and electrode system 16 of tube 17. Control pulses are supplied to the switching unit over conductor 46 so that the coupling circuit between the receiver and indicator is interrupted in response to each control pulse.

Unit 51 also serves to supply pulses from a range marker generator 52 which are available upon the selective closure of a switch 53. In this way, a series of spaced markers of greater illumination than the remainder of the trace define cursor 21 which thus may be employed for both bearing and range determination. Marker generator 52 is synchronized with the undelayed and delayed pulses available at leads 25 and 29, respectively, and alone may be of any well-known design.

As pointed out hereinbefore, the repetition frequency of the pulses from source 13 is under the control of the keyer 12, and hence, that frequency is subject to variation. Inasmuch as the repetition frequency of generator 24 is synchronized with that of source 13, a lesser number of sweeps per second are developed if, for any reason, it is required that the pulse repetition frequency be decreased. This tends to decrease the average illumination of viewing screen 18, and in order to avoid a decrease in resolution of target indications due to time-sharing of cursor and target sweeps, it is desirable to maintain the number of cursor sweeps per unit time at some low, minimum value. This function is aptly performed by a control generator 45, constructed in accordance with another feature of my invention, later to be described.

It will thus be seen that between pulses 48 of the curve 2*f*, the device 17 operates exactly as a plan-position-indicator. The ray is deflected radially from the center of the screen by each sawtooth wave from the sweep generator, and the radial direction of the sweep rotates over the surfaces of the screen as the antenna rotates about the horizon. The intensity of the ray is simultaneously modulated by received echoes to produce illuminated spots on the screen at positions corresponding to the location of objects from which such echoes are received.

During the pulses 48 this same operation occurs except that the direction of radial deflection of the ray from the center of the screen is determined, not by the position of the antenna 10, but by the position of the index member controlled by cursor control knob 22. Since this may be stationary the ray may be deflected in a single direction and a bright line 21 is produced across the screen in that direction. By rotating the knob 22 that line 21 may be rotated about the center of the screen in any desired direction.

This control of the trace, alternately by antenna 10 and cursor control knob 22, occurs at the frequency of the wave 2f, which is such that illuminated spots comprising the remote target indications and the cursor line 21 appear on the screen as a simultaneous and continuous presentation. Thus, by rotating knob 22 the line 21 may be moved to a position such that it traverses any remote object indication that may appear on the screen. This greatly facilitates the determination of the direction of the remote object from the equipment by inspection of the screen and scale 23.

Moreover, the pulses produced by the range marker generator 52 and supplied to the cathode ray tube through switching unit 51 produce bright spots along the cursor line at intervals corresponding to predetermined distances in space. By relating the position of a remote object indication to these bright spots the determination of the range to the object is determined, i. e., the cursor becomes a scale measuring the distance from the equipment to the remote object.

Figure 3:
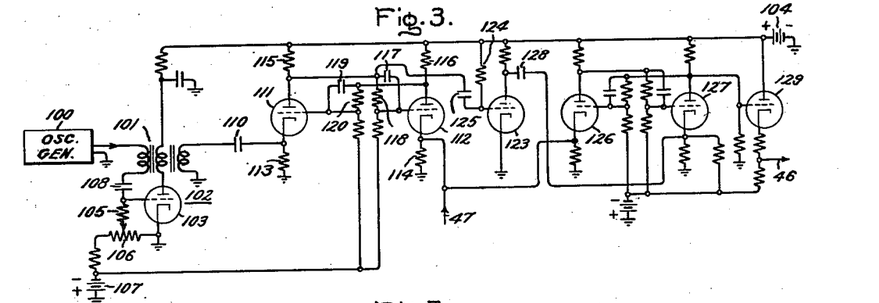
Figs. 3 and 5 are detailed schematic representations of portions of the apparatus shown in Fig. 1.

Referring to Fig. 3, this figure shows the details of the control generator 45, which operates to produce square wave pulses that are supplied over conductor 46 to control switching units 51 and the centering control switching units 35 and 38. These pulses are also supplied through unit 50 to the cathode of the cathode ray tube 17 to turn the ray in that tube off and on.

This generator comprises a reference source 100, which may be an ordinary sine wave oscillator of the power line, operating, for example, at 60 cycles. Output energy from generator 100 is supplied through one of the windings of a transformer 101 to a blocking oscillator 102. This oscillator comprises an electron discharge device 103 having a cathode connected to ground and an anode connected through a second winding of transformer 101 to the positive terminal of a source of operating potential 104. Its control electrode is connected through a resistance 105 to the variable tap of a potentiometer 106, the latter of which is connected in a circuit across a source of biasing potential 107, thereby to adjust the bias between the control electrode and cathode of device 103 in accordance with the adjustment of the potentiometer.

The transformer 101 couples the anode circuit of the device 103 to its grid circuit and is of such character as to render the circuit oscillatory, but owing to the accumulation of charge on a condenser 108 during one portion of the cycle of operation, the grid becomes sufficiently negative to interrupt anode current in device 103. In the following portion of the operating cycle, the charge of condenser 108 gradually leaks off, and the grid of device 103 is carried to a potential wherein anode current again flows to permit oscillations to take place. In other words, the oscillator blocks, or oscillates intermittently, and a sawtooth wave is generated on condenser 108.

The sine wave 4a (Fig. 4) from oscillator 100 is added to this sawtooth wave at the grid of device 103 to produce the wave represented by the curve 4b. During the intervals 109, when this combined wave drives the grid of the oscillator to a conducting condition, the oscillator operates and generates the pulses represented by curve 4c. It is inoperative during the time between the intervals 109. These pulses have a repetition frequency which is controllable by adjusting the tap of potentiometer 106. In this example, the pulses produced by blocking oscillator 102 have a repetition frequency to equal to ⅛ that of the applied sine wave frequency. They are taken from the output winding of transformer 101 and are applied through a capacitance 110 to a multivibrator comprising electron discharge devices 111 and 112.

The cathodes of the two discharge devices 111 and 112 of the multivibrator are connected to ground through respective resistances 113 and 114. The anodes are connected to the positive terminal of the source of operating potential 104 through respective resistances 115 and 116. The anode of device 111 is connected to the grid of the device 112 through a condenser 117 in parallel with a resistor 118, and similarly, the anode of device 112 is connected to the grid of device 111 through a condenser 119 that is shunted by a resistor 120. Individual grid resistors connect the grids of these devices to the negative bias source 107.

Since the anode of each of devices 111 and 112 is connected by one of the resistors 118 and 120 to the grid of the other device, the multivibrator circuit has two stable-operating conditions, wherein one tube is conductive and the other is cut off. If, for example, a positive potential is applied to the grid-cathode circuit of the non-conductive device, or a negative potential is applied to the grid-cathode circuit of the conductive device, a change from one operating condition to the other is effected. Because the output circuit of each tube is effectively connected to the input circuit of the other, this action is regenerative and the change in operating conditions is almost instantaneous.

In this illustrative example of my invention, it is assumed that normally device 111 is conductive and device 112 is cut off. Pulses from blocking oscillator 102 are applied through condenser 110 to the cathode of device 111 and are of sufficient amplitude to drive the cathode momentarily in a positive direction with respect to the grid. Hence, any one of these pulses serves to decrease current in device 111 and, due to the resulting increase in anode potential, the grid of device 112 is driven positive relative to its cathode, and current flow is initiated in that device. The resulting decreasing in anode potential of tube 112 further increases the grid-cathode voltage of device 111 in a negative sense and that device draws still less current. At the termination of this regenerative action, device 112 is conductive and device 111 is rendered non-conductive. This condition is maintained until the next following pulse is received over conductor 47 to drive the cathode of device 112 in a positive direction relative to its grid, whereupon the circuit is returned to the initially-assumed condition. Succeeding positive pulses at the cathode of device 112 have no effect because, in the initial state of the multivibrator, this device is cut off and nothing more occurs until a pulse from blocking oscillator 102 initiates another cycle of operation.

It is thus evident that each pulse of curve 4c (Fig. 4) alters the condition of conduction between tubes 111 and 112 from the initial state to an altered one, and the next succeeding pulse of curve 4d restores the initial state. Curve 4d is a reproduction of curve b of Fig. 2 and represents the pulses supplied by delay device 28 (Fig. 1) over conductor 47. In the initial condition of the circuit, the anode potential of device 111 has a low value, whereas this potential quickly increases when a change to the altered condition is effected. The increased potential is maintained until the circuit is returned to its initial state, and hence there is developed in the anode circuit of device 111 a pulse-type undulating output potential, such as represented by curve 4e. The leading edge of each pulse of curve 4e is concomitant with a pulse of curve 4c, and the trailing edge is defined by the next following pulse of curve 4d. Since, in this example, the sine wave of curve 4a is not synchronous with the sequence of pulses of curve 4d, successive pulses in the anode circuit of device 111 may not have the same duration, as illustrated by pulses 121 and 122 of curve 4e. Moreover, the period between these pulses may not be constant, although variations in the period are not very great.

Output pulses from the multivibrator are applied to a differentiating amplifier including an electron discharge device 123. The cathode of device 123 is grounded, its anode is connected to the positive potential source 104 through an anode load, and its control electrode is also connected to source 104 through a grid resistor 124 so that device 123 is normally highly conductive.

In order to apply output pulses from multivibrator 111—112 to amplifier 123, the grid of the amplifier is connected through a condenser 125 to the anode of tube 111. The respective resistance and capacitance values of elements 124 and 125 are selected, in a known manner, to differentiate electrically the applied undulating potential. In other words, in response to an applied pulse of positive polarity, there is developed at the grid of tube 123 a sharp positive pulse followed by a sharp negative pulse, which correspond to the leading and trailing edges, respectively, of the applied pulse.

Figure 4:
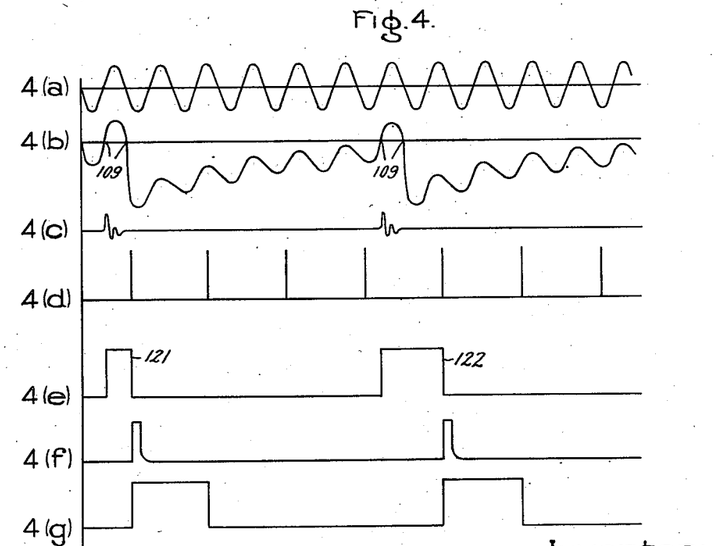
Fig. 4 represents various wave-forms characterizing the operation of the circuit illustrated in Fig. 3.

The leading edge of the pulse (curve 4e) from the anode circuit of tube 111 causes a sharp positive pulse to be supplied to the grid circuit of tube 123, but since this tube is normally highly conductive, its anode current is not altered thereby. However, the negative pulse, corresponding to the trailing edge of the applied pulse, drives the grid-cathode potential in a negative direction and to the extent that anode current is interruped for the duration of this pulse. As a result, a series of pulses, of positive polarity because of the usual phase inversion of an amplifier are developed in the anode circuit of tube 123 and these pulses are represented by curve 4f.

The latter pulses are supplied to another multivibrator, including a pair of electron discharge devices 126 and 127 connected in a circuit like the one comprising tubes 111 and 112. In the normal state of multivibrator 126—127, tube 127 is conductive and the tube 126 is non-conductive. Each pulse of curve 4f is applied, via a coupling condenser 128, to the cathode of normally conducting tube 127, and since these pulses are of positive polarity, the conductive state of the multivibrator is changed in the same manner as described in connection with multivibrator 111—112. The next succeeding pulse (curve 4d) supplied to the cathode of tube 126 over lead 47, drives the cathode potential of this tube in a positive direction relative to it grid, and the initial set of conditions is obtained. Of course, since in its initial state tube 126 is cut off, succeeding pulses at its cathode have no effect and the cycle of operation is repeated with the occurrence of another pulse (curve 4f) from tube 123.

As a result of this alternation in conditions, the anode potential of tube 127 varies in pulse-fashion, as represented by curve 4g. The leading edge of each pulse is concomitant with each pulse of curve 4f and the trailing edge is determined by the next following pulse of curve 4d.

The anode of device 127 is directly coupled to the control grid of an electron discharge device 129, connected in a cathode follower circuit. Hence, the pulses produced in the anode circuit of tube 127 are supplied to the cathode follower, and since lead 46 is connected to the cathode circuit of this latter stage, control pulses, correspondindg to those of curve 4g, are supplied to units 35, 38, 50, and 51 (Fig. 1). These pulses are the same pulses represented by curve 2f of Fig. 2.

Since the occurrence of each pulse of curve 4g is dependent solely upon the occurrence of a pulse of curve 4c, the period between successive ones of the first-mentioned pulses does not materially vary with a change in the repetition period of the pulses, represented by curve 4d. This means that, although the number of target-indicating sweeps per unit time produced on screen 18 (Fig. 1) may vary over a wide range, because the periods in which the cursor sweeps appear on the screen at times substantially dependent on the pulses of curve 4c, their number per unit time remains essentially unchanged, and target resolution is not impaired. Thus by maintaining a constant average rate of application of cursor sweeps, which is independent of the recurrence rate of target indicating sweeps, and by insuring that each of the periods of application of the cursor sweeps is conditioned to replace only a predetermined number of the target indicating sweeps, applicant is able to achieve an improved composite form of display. This may be more apparent in the following discussion of the centering control and switching unit 35 and 38, wherein it will be shown that every pulse of curve 4g (or curve f of Fig. 2) defines an interval during which a cursor sweep is produced on viewing screen 18, whereas in each interval between pulses, several target-indicating sweeps are produced.

Figure 5:
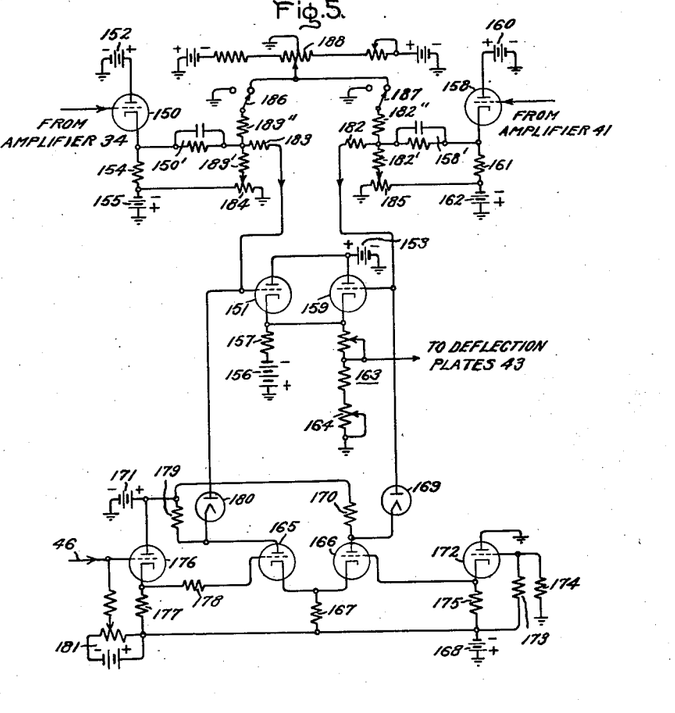

Turning now to Fig. 5, there is illustrated a centering control and switching circuit arrangement which may be employed to perform the function of one of the units 35 and 38 (Fig. 1). Of course, two of these arrangements are necessary, but a discussion of one will serve to illustrate this part of my invention, since both are alike.

Considering, for example, unit 35, the north-south sweep component from amplifier 34 is applied to the input circuit of a translating channel comprised of a pair of cathode followers in cascade. These include electron discharge devices 150 and 151, respectively, the anodes of which are connected directly to individual sources of positive operating potential 152 and 153. The cathode of device 150 is connected through a cathode load impedance 154 to a source of negative potential 155, and the cathode of device 151 is connected to another source of negative operating potential 156 through a cathode load impedance 157.

The corresponding cursor sweep component from amplifier 41 is applied to a similar translating channel including another pair of cathode followers connected in cascade relation. These are comprised of respective electron discharge devices 158 and 159. The anode of device 158 is connected to a source of positive potential 160, and its cathode is connected through a cathode load impedance 161 to a source of negative potential 162. The anode of device 159 is connected to source 153 and its cathode is directly connected to the cathode of device 151 of the first-mentioned translating channel. Moreover, the cathode circuit of devices 151 and 159 also includes a series resistance network 163 including a variable resistor 164. A tap of network 163 is connected to deflection plates 43 of cathode ray tube 17 (Fig. 1).

Each of translating channels 150—151 and 158—159 is effective in translating the respective sweep waves from amplifiers 34 and 41 to deflection plates 43. In order to preclude undesirable attenuation of high-frequency components in the translated sweep wave, the translating channels are provided with a pair of resistor-condenser combinations 150' and 158'. One of these combinations is included in series relation with the coupling circuits between the cathode followers of each of the translating channels.

For effecting the selective alternation between the two sweep components, devices 151 and 159 are selectively disabled by a switching circuit which comprises a pair of electron discharge devices 165 and 166, shown at the bottom of the figure. These devices have a common cathode resistor 167, and, as will be seen from the following discussion, their anode currents are inversely related to one another. Each is coupled to one of the cathode-follower channels in such a manner that its associated channel is disabled in response to high anode current, and hence, the channels may be disabled in alternation.

The anode of device 166 is connected to the cathode of a diode rectifier 169, the anode of which is connected to the control grid of device 159, and, an anode resistor 170 extends from the anode of device 166 to a source of positive operating potential 171. The control grid of device 166 is directly connected to the cathode of another electron discharge device 172, the control grid of which is connected to a voltage divider 173—174 shunted across source 168. The anode of the latter device is grounded and its cathode is connected to the negative terminal of a source 168 through a resistor 175. The positive terminal of this source is grounded. Thus, the tube 172 normally passes current through resistance 175. Device 172 and its associated circuit serve as a low impedance voltage source to maintain the grid potential of device 166 at a value slightly more positive than the cathode potential, say, one volt, in the absence of a control potential which may be applied via lead 46, to alter the relative conductivities of devices 165 and 166, as will be described hereinafter.

Lead 46 is connected to the control electrode of a cathode follower device 176, having its cathode connected through a resistor 177 to the negative terminal of source 168, and its anode directly connected to the positive terminal of source 171, the negative terminal of which is grounded. Its cathode is connected to the control grid of device 165 through a resistor 178. The anode of device 165 is connected to source 171 through a resistor 179, and to the cathode of another diode rectifier 180. The anode of diode 180 is directly connected to the control grid of cathode follower device 151.

In describing the operation of the circuit just described, a normal condition of operation is assumed in which no control pulses are supplied over lead 46. A biasing battery and potentiometer arrangement 181 in the grid circuit of cathode follower device 176 is adjusted so that in this normal condition of operation, anode current in device 176 is cut off and there is no voltage drop across resistor 177. As a result, the only bias applied to device 165 is that caused by the voltage drop due to anode current flow in device 166 through cathode resistor 167. The cathode of device 165 thus is more positive than its grid, and consequently it conducts little or no anode current. Because of this low anode current, the voltage drop across resistor 179 is small and the cathode of rectifier 180 is maintained at a potential higher than its anode, so that it does not conduct current. In other words, in this condition of operation diode 180 may be compared with a single pole, single throw switch that is in an open position. Thus, the bias for cathode follower device 151 is determined by the voltage drop across the cathode resistor 154 of device 150 and the potentials of sources 155 and 156, which are apportioned to provide a suitable operating bias for normal current flow and the translation of the sweep wave from amplifier 34 to deflection plates 43.

Inasmuch as device 166 is highly conductive, the voltage drop across a resistor 170 in its anode circuit is large. Because of this large voltage drop, the voltage at the cathode of diode 169 is more negative than at the plate and current flows through the diode, resistor 182 and the parallel paths including resistors 182' and 182", respectively. In other words, diode 169 operates as a closed switch. The resulting voltage drop across resistor 182 is such that the control grid of cathode follower device 159 is at a high negative potential relative to its cathode and anode current therein is cut off. That is to say, cathode follower device 159 is disabled so that the sweep component from amplifier 41 and cathode follower 158 is not translated to deflection plates 43.

With the occurrence of a positive pulse from generator 45 at lead 46, the grid of cathode follower device 176 is raised to a potential wherein anode current flows, and the voltage at its cathode correspondingly increases in a positive sense. This increases, in a positive direction, the voltage applied to the control grid of device 165 to the extent that the cut-off bias is overcome and the resulting anode current produces a voltage drop across anode resistor 179. Consequently, the cathode of diode 180 is carried to a potential more negative than its plate and, since the diode now operates as a closed switch, a portion of the anode current of device 165 flows through the diode, through a resistor 183 and through the parallel paths including resistors 183' and 183", respectively. This produces a voltage drop across resistor 183 which carries the grid of cathode follower device 151 to a high negative potential relative to its cathode, thereby to interrupt current flow. Hence, the signal from cathode follower 150 is not translated to deflection plates 43. This condition subsists for the duration of each control pulse at lead 46.

Each of these pulses has an amplitude sufficient to cause the anode current of device 165 to be greater than that of device 166 so that the voltage drop across cathode resistor 167 is materially increased. The resulting positive cathode potential, applied to device 166, interrupts anode current therein and the voltage drop across resistor 170 is decreased thereby raising the cathode potential of diode 169 above its anode. This interrupts current flow in the diode which thus becomes an open switch and the operating grid bias for device 159 is permitted to assume a value determined by the potential of sources 156 and 162 and the voltage drop across cathode resistor 161. These, of course, are apportioned to provide a suitable operating bias for normal current flow in device 159. Consequently, the sweep wave from amplifier 41 via cathode follower device 158 is translated by cathode follower device 159 to deflection plates 43.

At the termination of the control pulse at lead 46, the initially-assumed set of conditions are re-established wherein diode 169 operates as a closed switch and diode 180 functions as an open switch.

It is thus evident that in the absence of a control pulse at lead 46 the signal channel, comprising cathode follower devices 150 and 151, translates target-indicating sweeps to deflection plates 43, and the other channel, including cathode follower devices 158 and 159 is disabled. During the occurrence of each control pulse, the latter channel is operatively conditioned, whereas the former is disabled, thereby providing the switching action described in connection with curves *d—g* of Fig. 2.

The circuit arrangement of Fig. 5 also provides means for applying a static deflecting potential to the plates 43 of the cathode ray tube 17 for centering purposes. This includes means for adjusting the grid bias of devices 151 and 159 to regulate the static potential drop across resistor 157. Of course, since one of plates 43 is connected to a tap of network 163 and the other is grounded, this potential governs the static position of the electron beam in tube 17.

An individual bias adjustment for device 151 comprises a potentiometer 184 connected to source 155 and having a tap connected to the control grid of device 151 through resistors 183' and 183. A similar adjustment for device 159 includes a potentiometer 185, connected to source 162, and having a tap connected to the control grid of device 159 through resistors 182' and 182. Since devices 151 and 159 are disabled in alternation, during the operating intervals wherein anode current is cut off in one of the devices, its bias adjusting means has no effect. However, during the operating intervals in which the device is operatively conditioned, anode current may be regulated by adjusting its associated one of the potentiometers 184 and 185 so that the quiescent voltage drop across the cathode resistor 157 produces a required static deflecting potential, for plates 43. In this way, the static positions of the target-indicating sweeps and of the cursor sweeps on viewing screen 18 of tube 17 may be individually adjusted for proper super-position of the composite display.

With each of a pair of switches 186 and 187 in the positions illustrated, the control grids of devices 151 and 159 are connected to another static control circuit including a potentiometer 188. The center of the element of potentiometer 188 is grounded and its extremities are connected to respective sources of positive and negative supply potential to provide another adjustable biasing means for cathode follower devices 151 and 159. Since potentiometer 188 controls the bias for both of these devices, it serves as the means for statically displacing the entire composite display on viewing screen 18.

Element 188 also may be employed to displace statically the composite display on the indicator viewing screen to the extent that it may be off-centered. In this connection, the amplitude of the sweep wave applied to deflection plates 43 may be increased by adjusting resistor 164 of network and a selected portion of the display is effectively enlarged.

If either of switches 186 and 187 is in its other operative position, control 188 is ineffective to position statically the associated one of the target-indicating and cursor sweeps.

Variable resistor 164 also serves as a continuous range adjustment in the display on viewing screen 18 for each of the several range scales which may be obtained by presetting control 27 of range control unit 26 (Fig. 1). For example, if control 27 provides ranges of 4, 10 and 20 miles, by suitably adjusting resistor 164, the available ranges are 4–40 miles, 10–100 miles, and 20–200 miles.

While I have shown a particular embodiment of my invention, I do not wish to be limited thereto since different modifications both in the circuit arrangement and in the instrumentalities employed may be made, and I contemplate by the appended claims to cover any such modifications as fall within the true scope and spirit of my invention.

What I claim as new and desire to secure by Letters Patent of the United States is:

1. The combination, in a remote object-locating system, means to project radio pulses in a predetermined direction, a cathode ray device including a screen, means to radially deflect the ray of said device from a first position on said screen in a direction corresponding to said predetermined direction, means to vary the direction in which said pulses are projected and the direction of said radial deflection synchronously and means responsive to received echo to intensify said deflection in a position corresponding to remote objects whereby illuminated spots appear on said screen at points corresponding to the position of said objects in space, a manual control member, means alternately to disable said means to deflect and to radially deflect said ray from a second position on said screen in a direction corresponding to the position of said control member thereby to produce a radial line on said screen movable radially about said second position as the position of said control member is varied, whereby the position of said line may be adjusted to intersect the indication of any remote object to facilitate determination of the location thereof.

2. A display system for object-locating apparatus comprising a cathode ray indicator including a viewing screen, means for projecting an electron beam toward said screen, a single two-coordinate deflection means for deflecting said beam relative to said screen, sweep generating means for deriving a pair of sweep waves of like repetition frequency, means to vary one of said waves in accord with the bearing of an object to be located, to derive bearing sweeps, means for applying said bearing sweeps to said single deflection means, means to vary the other of said waves in accord with the direction of a desired cursor to be produced on said screen to derive cursor sweeps, means for coupling said bearing sweeps to said single deflection means, and means independent of any change in frequency of said sweep waves from said sweep generating means for coupling a predetermined number of cursor sweeps at a fixed time rate to said single deflection means in place of said bearing sweeps, whereby remote object indications and said desired cursor appear on said screen.

3. A display system for object-locating apparatus comprising a cathode ray indicator including a viewing screen, means for projecting an electron beam toward said screen, a single two-coordinate deflection means for deflecting said beam relative to said screen, sweep generating means for deriving a pair of sweep waves of like repetition frequency, means to vary one of said waves in accord with the bearing of an object to be located, means to vary the other of said waves in accord with the direction of a desired cursor to be produced on said screen, switching means coupling said sweep generating means to said single beam deflection means for supplying said pair of sweep waves thereto alternately, whereby remote object indications and said desired cursor appear on said screen, a control generator synchronized with said sweep generating means for deriving a pulse-type control potential having a repetition frequency smaller than said like repetition frequency and a pulse-duration corresponding to the period thereof, and means for coupling said control generator to said switching means to effect switching in response to said pulse-type potential.

4. The combination, in an object-locating system, a rotatable directional antenna to radiate pulses and to receive echoes thereof, a rotatable control member, a cathode ray tube having a viewing screen and a two-coordinate deflection system, means generating two pairs of sawtooth waves, means to supply said pairs of waves to said deflection system alternately to control the direction of deflection of the ray thereof over said screen, means to control one pair of waves in accord with the direction of said antenna to maintain the direction of deflection of said ray across said screen in correspondence to the direction of orientation of said antenna, means to control the other pair of waves in accord with the position in rotation of said rotatable member thereby to produce a deflection of said ray in a direction corresponding to the position of said member, thereby to produce a line on said screen, means timed with respect to said generating means and said means to supply said pairs of waves for intensifying said produced line, means for producing range marks on said intensified produced line and means to modulate said ray in accord with received echoes during its deflection in accord with the position of said antenna whereby said echoes are indicated at positions on said screen and the direction thereof may be determined by rotation of said rotatable member to a position where said line intersects one of said indications.

5. A display system for object-locating apparatus including a rotatable electric-wave intercepting device, said system comprising a cathode ray indicator including a viewing screen, means for projecting an electron beam toward said screen a single two-coordinate deflection means for deflecting said beam relative to said screen, sweep generating means for deriving recurrent sweep waves, resolving means electrically coupled to said sweep generating means and mechanically coupled to said intercepting device for producing one pair of sawtooth wave components having amplitudes representing the instantaneous position of said intercepting device, a rotatable manual control, additional resolving means electrically coupled to said sweep generating means and mechanically coupled to said manual control for producing another pair of sawtooth waves having amplitude values collectively defining the position of said control, a source of periodic timing signals and switching means timed with respect to said timing signals and the recurrence of said sweep waves for coupling each of said resolving means to said beam deflection means for supplying said pairs of sweep waves thereto alternately, whereby remote object indications and a direction cursor appear on said screen.

6. The combination, in an object-locating system, a rotatable directional antenna to radiate pulses and to receive echoes thereof, a rotatable control member, a cathode ray tube having a viewing screen and a two-coordinate deflection system, means generating two pairs of sawtooth waves, means to supply said pairs to said deflection system alternately to control the direction of deflection of the ray thereof over said screen, means to control one pair of waves in accord with the direction of said antenna to maintain the direction of deflection of said ray across said screen in correspondence to the direction of orientation of said antenna, means to control the other pair of waves in accord with the position in rotation of said rotatable member thereby to produce a deflection of said ray in a direction corresponding to the position of said member, thereby to produce a line on said screen, means to modulate said ray in accord with received echoes at least during operating intervals wherein its deflection is in accord with the position of said antenna whereby said echoes are indicated at positions on said screen, and means synchronized with said generating means for varying the intensity of said ray during operating intervals of its deflection in accord with the position of said control member and at predetermined intervals to provide range markers along said line whereby the direction and range of objects producing corresponding echo indications may be determined by rotation of said rotatable member to a position where said line intersects one of said indications.

7. A display system for object-locating apparatus comprising a cathode-ray indicator including a viewing screen, means for projecting an electron beam toward said screen, means for deflecting said beam relative to said screen in two coordinates, sweep generating means for deriving one pair of sweep waves of like repetition frequency and having amplitudes which collectively define the bearing of an object to be located and for deriving at least one other sweep wave of said like repetition frequency to define a direction cursor on said screen, switching means coupling said sweep generating means to said beam deflection means for supplying said pair of sweep waves and said other sweep wave thereto in selective alternation, a control generator synchronized with said sweep generating means for deriving a pulse-type control potential having repetition frequency smaller than said like repetition frequency and a pulse-duration corresponding to the period thereof, and means for coupling said control generator to said switching means to effect said selective alternation in response to said pulse-type potential.

8. A display system for object-locating apparatus comprising a cathode-ray indicator including a viewing screen, means for projecting an electron beam toward said screen, means for deflecting said beam relative to said screen in two coordinates, sweep generating means for deriving one pair of sweep waves of like repetition frequency and having amplitudes which collectively define the bearing of an object to be located and for deriving at least one other sweep wave of said like repetition frequency to define a direction cursor on said screen, switching means coupling said sweep generating means to said beam deflection means for supplying said pair of sweep waves and said other sweep wave thereto in selective alternation, a control generator synchronized with said sweep generating means for deriving a pulse-type control potential having repetition frequency smaller than said like repetition frequency and a pulse-duration corresponding to the period thereof, said control generator being coupled to said switching means to effect said selective alternation with said additional sweep wave being applied to said deflecting means during the occurrence of the pulses of said control potential, and means for varying the intensity of said electron beam concomitantly with the occurrence of said pulses.

9. A display system for object-locating apparatus comprising a cathode ray indicator including a viewing screen, means for projecting an electron beam toward said screen, a single two coordinate deflection means for deflecting said beam relative to said screen, sweep generating means for deriving a pair of sweep waves of like repetition frequency, means to vary one of said waves in accord with the bearing of an object to be located, means to vary the other of said waves in accord with the direction of a desired cursor to be produced on said screen, switching means coupling said sweep generating means to said single beam deflection means for supplying said pair of sweep waves thereto alternately, whereby remote object indications and said desired cursor appear on said screen, a control generator synchronized with said sweep generating means for deriving a pulse-type control potential having a repetition frequency smaller than said like repetition frequency and a pulse-duration corresponding to the period thereof, means for coupling said control generator to said switching means to effect switching in response to said pulse-type potential, and means operable simultaneously at said switching means for applying each of a pair of adjustably-fixed, static, beam deflecting potentials to said deflection means together with the application of one of said pairs of sweep waves to said beam deflection means.

10. A display system for object-locating apparatus comprising a cathode ray indicator including a viewing screen, means for projecting an electron beam toward said screen, a single two-coordinate deflection means for deflecting said beam relative to said screen, sweep generating means for deriving a pair of sweep waves of like repetition frequency, means to vary one of said waves in accord with the bearing of an object to be located, means to vary the other of said waves in accord with the direction of a desired cursor to be produced on said screen, a pair of translating channels coupling said sweep generating means to said beam deflection means for translating individual ones of said pair of sweep waves, switching means for disabling each of said channels alternately, individual means included in each of said channels for supplying an adjustably-fixed, static, beam-deflecting potential to said beam deflection means during operating intervals wherein the associated one of said channels supplies a sweep wave to said beam deflection means, whereby remote object indications and said desired cursor appear on said screen at adjustable relative positions, a control generator synchronized with said sweep generating means for deriving a pulse-type control potential having a repetition frequency and a pulse-duration corresponding to the period thereof, and means for coupling said control generator to said switching means to effect switching in response to said pulse-type potential.

11. In a system including a cathode-ray device including beam deflection means and a pair of sources of sweep waves, a switching circuit comprising a pair of translating channels for coupling individual ones of said pair of sources to said beam deflection means, means for disabling each of said channels in selective alternation, and individual beam centering means included in each of said channels for supplying an independently adjustable, static, beam-deflecting potential to said deflection means during operating intervals when the associated one of said channels supplies a sweep wave to said deflection means.

12. In a system including a cathode-ray device including beam deflection means and a pair of sources of sweep waves, a switching circuit comprising a pair of translating channels each including an input circuit coupled to one of said sources and an output circuit, a pair of cathode followers having a common output circuit coupled to said beam deflection means and each including an input circuit coupled to said output circuit of an individual one of said channels, means for disabling each of said pair of cathode followers in selective alternation, and individual beam centering means coupled to each of said input circuits of said pair of cathode followers for supplying a separate, static, beam-deflecting potential to said deflection means during operating intervals wherein the associated one of said channels supplies a sweep wave to said deflection means.

13. A display system for object locating apparatus comprising a cathode-ray indicator including a viewing screen, means for projecting an electron beam towards said screen, a single two-coordinate deflection means for deflecting said beam relative to said screen, sweep generating means for deriving a pair of sweep waves of like repetition frequency, means to vary the magnitude of one of said waves in accord with the bearing of an object to be located, means to vary the magnitude of the other of said waves in accord with the direction of a desired cursor to be produced on said screen, switching means coupled to said single beam deflection means for supplying said pair of varied sweep waves thereto alternately, whereby remote object indications and said desired cursor appear on said screen, a source of recurrent timing pulses, said timing pulses having a duration equal to the period of said sweep waves, and timed to occur during every third or more of said sweep waves, and means for controlling the operation of said switching means in accordance with the timing of said pulses to effect the alternate supplying of said pair of sweep waves to said deflection means.

14. Apparatus for producing a moveable marker on the indicator of an object detection system having an adjustably directive wave transducer comprising, means synchronized with the instantaneous directivity of the wave transducer of said system for supplying a first signal to said indicator, a source of a second signal, means for producing a periodic third signal, and switching means operable by said third signal for applying said second signal instead of said first signal to said indicator during non-consecutive periods of said third signal.

15. An arrangement for displaying a first electrical signal occurring at a periodic rate and a second signal on the screen of a common cathode-ray device, comprising means for applying said first signal to said cathode-ray device at its periodically occurring rate, means for applying said second signal in substitution for every three or more occurrences of said first signal to said cathode-ray device, and means for controlling the operation of said applying means to effect the substitution of said second signal at a constant average rate which is independent of the periodicity of said first signal.

16. A source of periodic signals, a source of non-periodic signals, means for sequentially applying said signals to a common utilization device comprising, means timed with respect to non-consecutive periods of said periodic signals for applying said non-periodic signals in place of said periodic signals to said device for a time equal to a period of said first named signals.

17. A source of first periodic signals, a source of second signals, means for sequentially applying said signals to a common utilization device comprising a source of third periodic signals having a period larger than said first signals, means timed with respect to said first and third signals for applying said second signals in place of said first signals to said device for a time equal to a period of said first signals.

18. A display system for object-locating apparatus comprising a cathode ray indicator including a viewing screen, means for projecting an electron beam toward said screen, means for sweeping said beam across said screen to produce a trace, a source of first waves amplitude modulated in accordance with the position of an object to be located, a source of second waves amplitude modulated in accordance with a selectable reference position, said waves having the same recurrence rate, said sweeping means responsive to one of said waves to produce a corresponding position trace on said screen, a source of control signals having a recurrence rate independent of said same recurrence rate, said sweeping means timed with respect to said same recurrence rate and said control signals and responsive to the other of said waves for producing a position trace on said screen corresponding to said other wave position modulation in place of said one wave position trace at said independent recurrence rate.

References Cited in the file of this patent

UNITED STATES PATENTS

| | | | |
|---|---|---|---|
| 2,405,231 | Newhouse | Aug. 6, | 1946 |
| 2,521,726 | Ivall | Sept. 12, | 1950 |
| 2,547,363 | Bishop | Apr. 3, | 1951 |
| 2,554,994 | Lester | May 29, | 1951 |
| 2,557,644 | Forbes | June 19, | 1951 |
| 2,567,939 | Hugon | Sept. 18, | 1951 |
| 2,572,891 | Smith | Oct. 30, | 1951 |
| 2,572,975 | Berger | Oct. 30, | 1951 |
| 2,585,855 | Sherwin | Feb. 12, | 1952 |
| 2,588,114 | Haworth | Mar. 4, | 1952 |
| 2,603,775 | Chipp | July 15, | 1952 |
| 2,624,043 | Gerwin | Dec. 30, | 1952 |
| 2,712,647 | Sherwin | July 5, | 1955 |